United States Patent [19]

Osame et al.

[11] Patent Number: 5,244,144
[45] Date of Patent: Sep. 14, 1993

[54] METHOD FOR BRAZING ALUMINUM MATERIALS

[75] Inventors: Yasuhiro Osame, Oyamashi; Satoko Arai, Tochigi; Shoichi Sato, Oyamashi; Shuichi Murooka, Yukishi, all of Japan

[73] Assignee: Showa Aluminum Kabushiki Kaisha, Osaka, Japan

[21] Appl. No.: 974,680

[22] Filed: Nov. 12, 1992

Related U.S. Application Data

[63] Continuation of Ser. No. 570,380, Aug. 21, 1990, abandoned.

[30] Foreign Application Priority Data

Aug. 23, 1989 [JP] Japan .................................. 1-217955

[51] Int. Cl.$^5$ .............................................. B23K 35/38
[52] U.S. Cl. ................................ 228/219; 228/220; 228/262.51; 148/26; 148/DIG. 17
[58] Field of Search ............ 228/42, 219, 263.17, 228/220; 148/26, DIG. 33, DIG. 51, DIG. 7

[56] References Cited

U.S. PATENT DOCUMENTS

| | | | |
|---|---|---|---|
| 2,943,181 | 6/1960 | Gunow et al. | 219/85.17 |
| 3,970,239 | 7/1976 | Hill | 228/220 |
| 4,119,262 | 10/1978 | Yen et al. | 228/206 |
| 4,217,374 | 8/1980 | Ovshinsky et al. | 437/170 |
| 4,240,574 | 12/1980 | Schmatz et al. | 228/219 |
| 4,338,140 | 7/1982 | Reghi | 148/247 |
| 4,673,558 | 6/1987 | Senoue et al. | 423/240 |
| 4,889,589 | 12/1989 | McCommas | 156/656 |
| 5,022,961 | 6/1991 | Izumi et al. | 156/662 |

FOREIGN PATENT DOCUMENTS

| | | | |
|---|---|---|---|
| 63-60098 | 3/1988 | Japan | 228/263.17 |
| 64-87058 | 3/1989 | Japan | 228/263.17 |
| 2-284767 | 11/1990 | Japan | 228/221 |
| 3-146264 | 6/1991 | Japan | 228/221 |
| 3-230888 | 10/1991 | Japan | 228/263.17 |
| WO90/06204 | 6/1990 | PCT Int'l Appl. | 228/263.17 |
| 129469 | of 1960 | U.S.S.R. | 228/219 |

Primary Examiner—Mark Rosenbaum
Assistant Examiner—Jeanne M. Elpel
Attorney, Agent, or Firm—Tilton, Fallon, Lungmus & Chestnut

[57] ABSTRACT

A method is provided to braze aluminum materials to each other, the method comprising a step of producing a fluoride gas-containing atmosphere within a brazing oven. The method further comprises a step of brazing the aluminum materials, by heating said materials within said atmosphere melts. The fluoride gas-containing atmosphere is produced in the soldering oven: by introducing an inert gas and the fluoride gas through different passages; by introducing into the oven a mixture of the inert gas and the fluoride gas; or by heating a fluoride in a receptacle which is placed in the oven so as to gasify the fluoride within the oven.

4 Claims, 3 Drawing Sheets

METHOD FOR BRAZING ALUMINUM MATERIALS

This is a file wrapper continuation of prior application Ser. No. 07/570,380, filed Aug. 21, 1990, now abandoned.

BACKGROUND OF THE INVENTION

1. Field of the Invention

The invention relates to a method for brazing aluminum materials and an apparatus used therein, the aluminum materials being suited for manufacture of various goods such as heat exchangers which are generally made by the brazing process.

The word "aluminum" used in this specification is meant to include its alloys.

2. Description of Prior Art

Flux brazing method which uses a proper flux is widely employed in cases wherein the vacuum brazing is not available, in order to braze the aluminum parts of such heat exchangers made of aluminum and used as a radiator in automobiles, as an evaporator or condenser for car air-conditioners, or as elemental units of other electric or mechanical apparatus.

In the known flux brazing method, it has been a general practice to disperse first the flux in water or solvent so as to prepare a suspension. The suspension is then sprayed or showered onto the aluminum materials or parts which are to be bonded to each other, or they are immersed in the suspension which is to be applied thereto. After the aluminum parts are dried to remove water contained in the suspension, said parts are subsequently heated to a predetermined temperature in a non-oxidizing atmosphere so that a brazing agent is molten and the brazing is effected.

Productivity of such a known practice is however significantly low because it needs some operations for application of the suspension and also for drying the parts to which it has been applied. A drying oven used to dry said parts has rendered the equipment large-sized to a disadvantageous degree. It has been somewhat cumbersome to control the temperature of said suspension and the applied quantity thereof. Further, the aluminum materials are in general given an excessive amount of the flux so that brazing ovens are fouled therewith and/or the flux molten in the brazing ovens makes a deposit therein. Therefore, the cleaning or overhauling of the brazing ovens should be done at short intervals. The flux applied to the aluminum materials in the manner as mentioned above will remain as gray or white blots on the surfaces thereof after the brazing process is completed. Those blots not only make uneven the surface color of said materials but also make worse the smoothness or homogeneity of a subsequent surface treatment. It is very difficult to remove the remaining flux from the surfaces of aluminum materials because it is fixed thereto unseparably.

OBJECTS OF THE INVENTION

It is therefore an object of the invention to provide a method for brazing aluminum materials wherein no process is required to apply a suspension or to preliminarily dry the aluminum materials.

It is another object of the invention to provide a method for brazing aluminum materials wherein there is no possibility that a brazing oven is fouled with a flux.

It is a further object of the invention to provide a method for brazing aluminum materials wherein no significant amount of a flux remains on the surfaces of said materials after they have been brazed.

It is a still further object of the invention to provide an apparatus adapted to carry out the method which is just referred to above.

The inventors have conducted various experiments and researches to accomplish the objects and found as a fact that aluminum materials to be bonded can effectively be brazed to each other, either if they are heated to a predetermined temperature in a fluoride gas-containing atmosphere, or if said aluminum materials are pretreated in such a fluoride gas-containing atmosphere before they are heated to be brazed in another atmosphere containing substantially no fluoride gas, without applying any flux to said aluminum materials.

Other objects and advantages of the invention will become apparent from the following description.

SUMMARY OF THE INVENTION

At first, the invention which is applied to the brazing of aluminum materials within a fluoride gas-containing atmosphere will be described.

Fluoride gases do function in a manner similar to that of the known fluxes and thus are effective to remove oxide coating of the portions which are to be brazed. The wetting property and flowability of brazing agents are improved by the fluoride gases, thereby ensuring a high brazability. The words "fluoride gases" denote here gases of chemical compounds, i.e., fluorides which are composed of fluorine and other elements but which are not restricted to be of particular compositions. The fluorides have to gasify preferably at temperatures below 600 degrees centigrade, since the brazing of aluminum is conducted in general at about 600 degrees centigrade. For example, $KAlF_4$ (potassium tetrafluoroaluminum) and HF (hydrogen fluoride) may be used advantageously. Any one or any mixture of the fluoride gases may be employed. It is desirable to maintain a non-oxidizing atmosphere in an oven which contain such fluoride gases. In general, such an atmosphere is composed of an inert gas, for instance nitrogen gas, and the fluoride gases mixed therewith. For a satisfactory "flux effect", 0.1 to 10,000 ppm of the fluoride gases may be contained in the atmosphere. A poor content below 0.1 ppm is too low to realize a good flux effect, while a rich content above 10,000 ppm is superfluous failing to provide no higher flux effect. A range of 1 to 500 ppm is more preferable as the content of fluoride gases. Although water vapor or oxygen is to be excluded from the atmosphere, the flux effect will scarcely be reduced even if the atmosphere is mixed with water vapor or oxygen at a quantity thereof between 0.1 to 10,000 ppm. In the event that water vapor content would exceed 10,000 ppm, the $KAlF_4$ gas might not be generated, while in the event that oxygen gas content would exceed 10,000 ppm, the surface oxide layer might become so thick that the brazing process might be seriously affected.

Arrangements for adjusting the condition of the atmosphere within the brazing oven will be described below, only by way of example.

Figure 1:
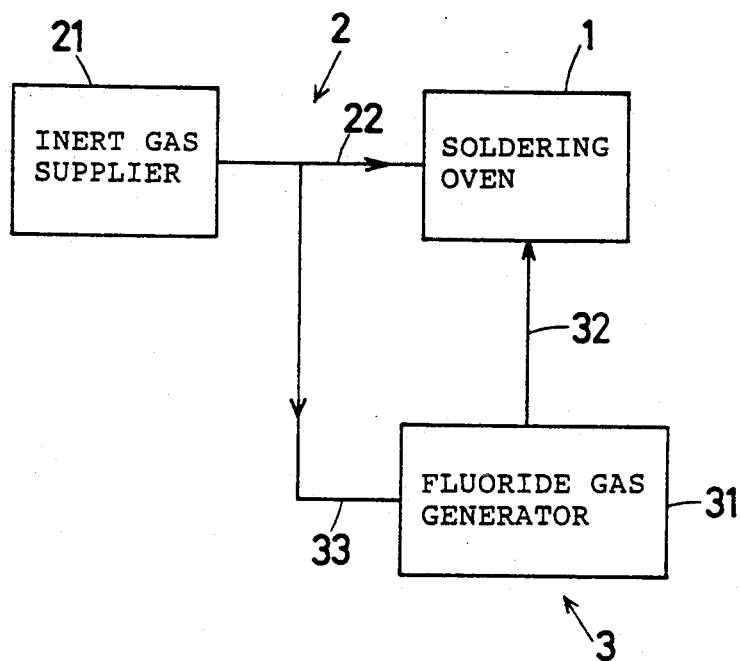
FIG. 1 is a block diagram showing an example of apparatus used to carry out a method according to the invention.

In a first exemplified arrangement, the inert gas such as nitrogen gas and fluoride gas(es) are introduced into the oven from respective sources. A brazing equipment according to this arrangement shown in FIG. 1 is provided with a brazing oven 1, an inert gas-supplying apparatus 2 for feeding the inert gas to the oven, and a fluoride gas-supplying apparatus 3 for feeding the fluoride gas(es) to the brazing oven. The inert gas-supplying apparatus 2 comprises an inert gas supplier 21 and an inert gas pipe 22, whereas the fluoride gas-supplying apparatus 3 comprises a fluoride gas generator 31 and a fluoride gas pipe 32. The fluoride gas flows into the oven through a passage and the inert gas does so through another passage whereby control of an amount of supplied fluoride gas can be effected easily. In the event that either passage becomes out of order, the other source may be relied on to continue operation by supplying the oven with a mixture of the inert gas and the fluoride gas, thus making easier the recovery of operable conditions. In detail, the oven is usually filled first with the inert gas before the fluoride gas is produced using a carrier gas in the fluoride gas generator 31 and is fed to the oven, the carrier gas being the inert gas which is transported to the oven through a carrier gas pipe 33 shown in FIG. 1. Alternatively, the inert gas and the fluoride gas may be charged into the oven at the same time. In case of the fluoride which is liquid or solid at the normal room temperature, it is to be preliminarily heated and gasified in the fluoride gas generator 31.

Figure 2:
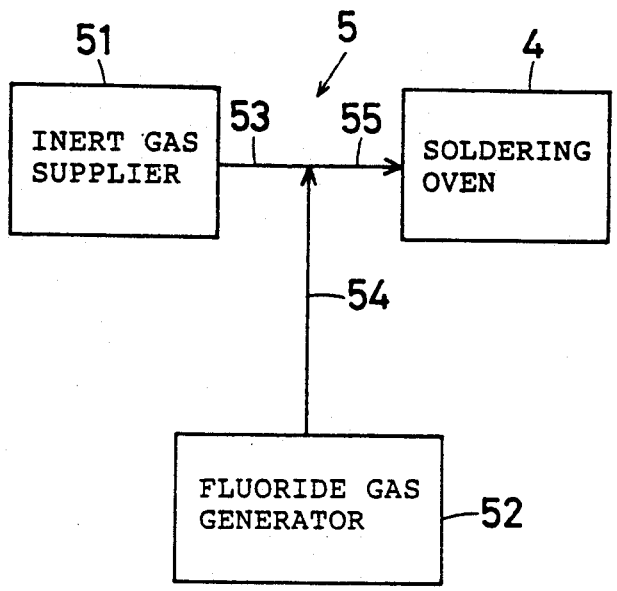
FIG. 2 is a block diagram showing another example of apparatus used to carry out the method according to the invention.
Figure 3:
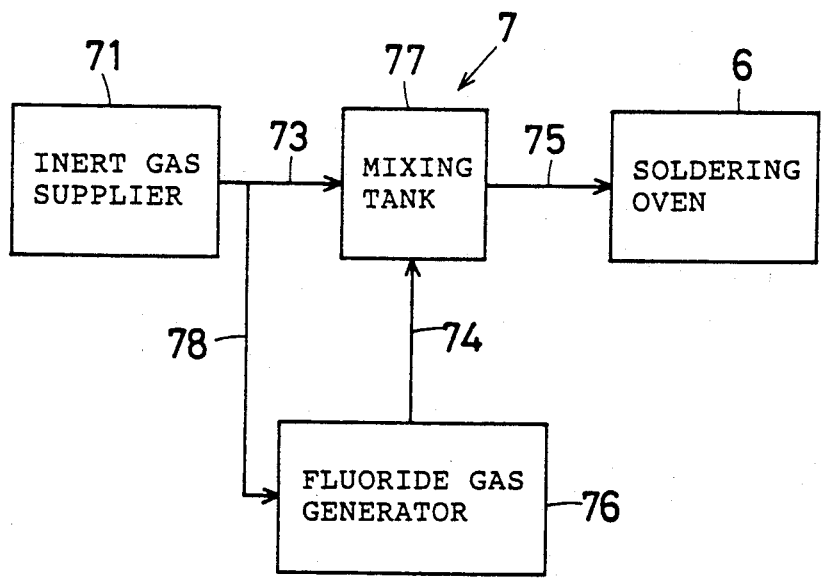
FIG. 3 also is a block diagram showing a further example of apparatus used to carry out the method according to the invention.

In another example of the arrangements, the inert gas and the fluoride gas are premixed on the outside of the brazing oven and subsequently supplied thereto. The brazing equipment in this case is illustrated in FIG. 2 or FIG. 3. The equipment in FIG. 2 is suited to use the fluoride such as HF which is in its gasified state at the room temperature or at the temperatures close to the room temperature. A brazing oven 4 and a gas mixture supplying apparatus 5 for feeding a gas mixture to the oven 4 are included in the equipment in FIG. 2. The gas mixture supplying apparatus 5 comprises an inert gas supplier 51, a fluoride gas supplier 52, an inert gas pipe 53, a fluoride gas pipe 54 and a gas mixture pipe 55. A mixture of an inert gas from the inert gas supplier 51 and a fluoride gas from the fluoride gas supplier 52 flows through the gas mixture pipe 55 into the brazing oven 4. On the other hand, the equipment shown in FIG. 3 is adapted to deal with the fluoride such as $KAlF_4$ which is liquid or solid at the room temperature, the equipment also comprising a brazing oven 6 and a gas mixture supplying apparatus 7. The gas mixture supplying apparatus 7 comprises an inert gas supplier 71, a fluoride gas generator 76, a mixing tank 77, an inert gas pipe 73, a fluoride gas pipe 74, a gas mixture pipe 75, and a carrier gas pipe 78 branched from the inert gas pipe 73. The fluoride is heated in the fluoride gas generator 76 so as to produce the fluoride gas, which is then carried by a carrier gas (i.e., the inert gas from the carrier gas pipe 78) and forwarded to the mixing tank 77. The fluoride gas is mixed within the mixing tank 77 with the inert gas from the inert gas pipe 73, thereby producing a gas mixture which subsequently flows through the gas mixture pipe 75 into the brazing oven 6. Such a supply of the mixed gas comprising the fluoride and inert gases contributes to formation of an atmosphere containing the fluoride gas homogeneously diffused throughout the oven. This homogeneous atmosphere renders surer and more reliable the brazing process.

In a still further arrangement, a fluoride is put in a receptacle disposed within a brazing oven and is heated to gasify. The fluoride used in this method must be solid or liquid at the room temperature and is to be gasifiable at the temperatures below 600 degrees centigrade since the brazing is performed in general at about 600 degrees centigrade. The fluoride $KAlF_4$ is suitable to this method. A mixture of fluorides also may be used instead of using a single fluoride. Further in this arrangement, a eutectic complex salt of KF (potassium fluoride) and $AlF_3$ (aluminum trifluoride) may be substituted for the fluorides exemplified hereinbefore. Though the receptacle may be of any arbitrary shape, a shallow dish-like one which is 5 to 50 mm in depth is preferred for smooth gasification and quick vaporization of the fluoride. Heat of evaporation is given to the fluoride naturally without aid of any particular means when the oven is heated to the brazing temperature. By simply placing the receptacle in the oven, the fluoride in said receptacle is automatically heated and gasifies to produce the necessary fluoride atmosphere in the oven whereby any special fluoride gas supplier needs not be added to the brazing oven, thus allowing any un-reconstructed conventional ovens to be employed in the invention.

In any arrangement mentioned above, a flow rate of the inert gas within the oven is to be predetermined to give a flow speed of 0.1 to 10 cm/sec.

Any type of brazing ovens, including the conveyer-equipped continuous oven and the batch-process oven, is available without affecting the advantages and effects in the invention.

After the fluoride gas atmosphere is prepared for the brazing oven in the manner as described above, the brazing process will be carried out next. A brazing agent is heated to a temperature within a range of 580 to 620 degrees centigrade so as to melt, this temperature being below a melting point of the aluminum materials which are brazed to each other in this process. The fluoride gas functions as a flux so that the materials are brazed satisfactorily. The brazing agent is usually an Al-Si (aluminum-silicon) alloy which contains about 4.5 to 13.5% by weight of Si (silicon). For the purpose of better convenience in operation, the brazing agent is applied preferably by the cladding method to at least one of the aluminum materials to be brazed.

Now, another mode of the method in the invention will be described, in which mode the aluminum materials are pretreated in a fluoride gas-containing atmosphere and are then soldered in a fluoride-free atmosphere.

In this mode, two ovens including a pretreatment oven and a brazing oven are employed, and the pretreatment oven is filled with a fluoride gas-containing atmosphere. The same fluoride gas(es) is (are) used as those in the first mode already described herein before, thus one or more of KAlF$_4$, HF and other fluorides may be used here, too. The fluoride gas-containing atmosphere may also be prepared by adding the fluoride gas into an inert gas such as nitrogen gas, argon gas, He (helium) gas or the likes. Temperature of said fluoride gas-containing atmosphere should be kept within a range below the melting point of the brazing agent and above the temperature at which the fluoride remains gasified. A temperature between 500 and 600 degrees centigrade, for example, is preferable for the atmosphere. Fluoride gas content of the atmosphere may also be controlled desirably to fall within a range from 0.1 to 10,000 ppm, and more preferably within a range from 1 to 500 ppm. Contents of water vapor and oxygen gas in the atmosphere had better to be zero, but these vapor or gas would not seriously affect the brazing process even if they are contained below a concentration of about 10,000 ppm. In order to prepare the fluoride gas-containing atmosphere in the pretreatment oven, any arbitrary method may be adopted. As an example, it is possible to previously mix the inert gas with the fluoride gas to make up a gas mixture before it is supplied to the pretreatment oven. Fluorides which are liquid or solid at room temperature are, in this case, to be previously gasified. Flow rate of the inert gas is to be such that its flow speed within the oven is from 0.1 to 10 cm/sec so as to homogeneously mix the fluoride gas with the inert gas.

Aluminum materials to be bonded to each other are transported into the pretreatment oven which is filled with the atmosphere prepared in the abovedescribed manner, and maintained therein for about 1 (one) minute for the purpose of pretreatment.

After such pretreatment, the aluminum materials are then transferred to the brazing oven filled with an inert gas such as nitrogen gas which includes substantially no fluoride gas but may contain an inevitable little quantity thereof. A brazing agent which is of a melting point lower than that of the aluminum materials will be molten in the soldering oven at a temperature within a range from about 580 to 620 degrees centigrade. The aluminum materials are thus brazed satisfactorily with aid of the molten brazing agent. It is supposed that the surface oxide layers of the aluminum materials are removed in the pretreatment owing to the "flux effect" of the fluoride gas to such a degree that the brazing is effected perfectly, even though said materials are merely held within the fluoride gas-containing atmosphere in the pretreatment atmosphere only for a short period of time.

Figure 4:
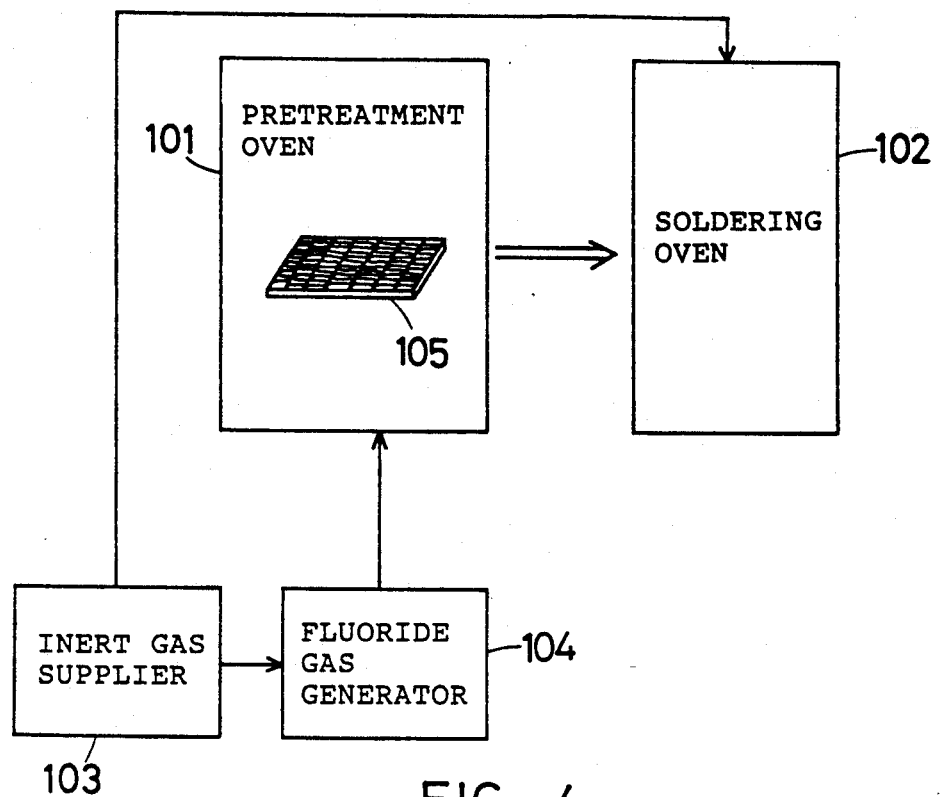
FIG. 4 is a further block diagram of a still further example of apparatus wherein aluminum materials are soldered after they have been pretreated in a fluoride gas-containing atmosphere.
Figure 5:
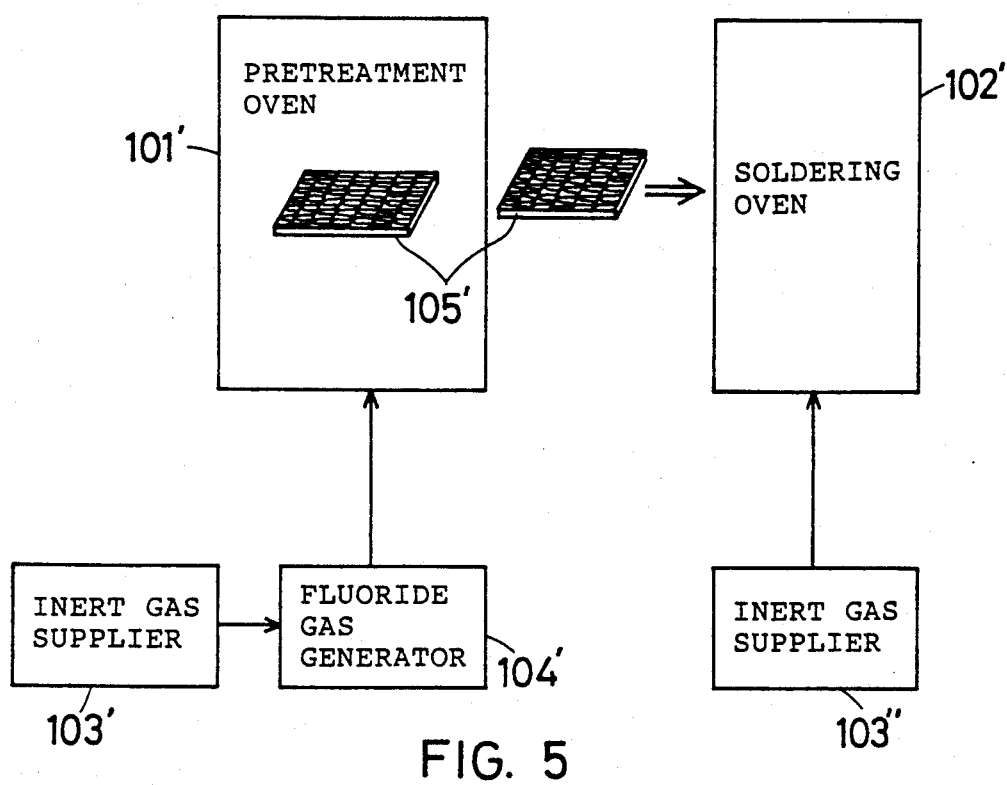
FIG. 5 is still another block diagram showing an example which may be substituted for the example shown in FIG. 4 and also be adapted to braze aluminum materials after they have been pretreated in an atmosphere containing a fluoride gas.

Arrangement including the brazing oven and the pretreatment oven may form a continuous system shown in FIG. 4, or may alternatively form a batch system shown in FIG. 5. The continuous system in FIG. 4 comprises: a pretreatment oven 101; a brazing oven 102; an inert gas supplier 103; an inert gas generator 104, wherein a fluoride gas is blended with an inert gas before charged into the pretreatment oven 101. Aluminum materials 105 to be brazed are continuously transferred from the pretreatment oven 101 to the brazing oven 102, by means of a proper means such as a conveyor. Pressure of the inert gas which is fed to the brazing oven 102 prevents the fluoride gas-containing atmosphere from flowing thereinto from the pretreatment oven 101. On the other hand, the batch system in FIG. 5 comprises: a pretreatment oven 101'; a brazing oven 102'; inert gas suppliers 103' and 103''; and a fluoride gas generator 104', wherein the aluminum materials 105' to be brazed are taken out of the pretreatment oven 101' after treated therein, and thereafter transported into the brazing oven 102'. The aluminum materials which are removed from the pretreatment oven 101' should preferably handled within a non-oxidizing atmosphere in order that undesirable reformation of oxidized surface layer is avoided as perfectly as possible.

It will now be apparent that the method for brazing aluminum materials in the invention is characterized in that the fluoride atmosphere is produced in the brazing oven and subsequently or simultaneously the aluminum materials are heated to the predetermined temperature so as to be brazed with the aid of the brazing agent which melts at said temperature. There is no necessity of applying any flux suspension to said materials or of drying same after such an application. Therefore, the brazing process is made simpler and the productivity thereof is improved in the invention. The brazing equipment is rendered small-sized owing to the omission of the drying oven, and further the overall efficiency of the brazing process is improved by cutting out unnecessary control of the temperature and applied quantity of suspension. An amount of the fluoride gas functioning as the flux is remarkably less than the amount of flux applied in the known manner so that the inside of the brazing oven is hardly contaminated with the fluoride. There arises no drop of molten flux nor any deposit thereof inside the oven, thereby making less frequent the cleaning or overhauling of said oven. In addition, a residual amount of the fluoride remaining on the surface of the brazed aluminum materials is much less than that in the known method. This feature is advantageous in that the brazed products obtain an excellent appearance free from any stain or blot and in that such a good surface is well adapted to a subsequent treatment.

Further, in a case wherein the aluminum materials are pretreated first in the fluoride gas-containing atmosphere within the pretreatment oven before they are brazed in the fluoride-free atmosphere within the brazing oven, an arbitrary length of time can be set for the pretreatment process, independently on the length of time required to the brazing process. The size of the pretreatment oven can be made smaller than the brazing oven in the continuous system. Such a smaller size of the pretreatment oven is advantageous in that consumption of the fluoride gas can be much lower than in the case where the brazing oven is filled with the fluoride gas-containing atmosphere, whereby processing cost of the brazing is remarkably reduced. The brazing oven is not impaired nor damaged since no fluoride gas is introduced thereinto, thus the cleaning or other maintenance works are needed only for the simply-constructed and smaller-sized pretreatment oven, thereby improving workability and economical efficiency of the method in the invention.

DETAILED DESCRIPTION OF THE PREFERRED EMBODIMENTS

Some preferred embodiments of the invention will be described below.

First Embodiment

Nitrogen gas was supplied to a brazing oven through a passage, and on the other hand an amount of a fluoride gas was charged into the oven through another passage, the fluoride gas containing 70 ppm of KAlF$_4$ which were heated to gasify, in nitrogen gas used as a carrier gas. Thus, the oven was filled with a fluoride-containing nitrogen atmosphere, which contained 100 ppm of water vapor and 8 ppm of oxygen.

Tubular members having a wall thickness of 0.8 mm and made of an aluminum alloy A1100 by the extrusion method were combined with fin members so as to assemble a heat exchanger of the corrugated type. Each of the fin members comprised a band-like core which was made of an aluminum alloy A3003 and had its both sides covered with skins of another aluminum alloy, that is, Al-10%Si-alloy functioning as a brazing agent. The skins which formed such a both-sided-brazing sheet were 0.145 mm in thickness and their cladding ratio were 15%. The assembled members were put in the brazing oven and brazed therein by being heated at a temperature of 600 degrees centigrade for five minutes.

Second Embodiment

Nitrogen gas was supplied to a brazing oven through a passage, and on the other hand an amount of a fluoride gas was charged into the oven through another passage, the fluoride gas containing 100 ppm of HF in nitrogen gas used as a carrier gas. Thus, the oven was filled with a fluoride-containing nitrogen atmosphere, which contained 80 ppm of water vapor and 3 ppm of oxygen. The same assembled members as in the first embodiment were put in the oven and brazed under the same condition as in the first embodiment.

Third Embodiment

Nitrogen gas was supplied to a brazing oven through a passage, and on the other hand an amount of a fluoride gas was charged into the oven through another passage, the fluoride gas containing 50 ppm of $KAlF_4$ which were heated to gasify as well as 50 ppm of HF in nitrogen gas used as a carrier gas. Thus, the oven was filled with a fluoride-containing nitrogen atmosphere, which contained 250 ppm of water vapor and 10 ppm of oxygen. The same assembled members as in the first embodiment were put in the oven and brazed under the same condition as in the first embodiment.

Fourth Embodiment

A fluoride gas containing 10 ppm of $KAlF_4$ which was heated to gasify was mixed with nitrogen gas which was being supplied to a brazing oven. Thus, the oven was filled with a fluoride-containing nitrogen atmosphere, which contained 120 ppm of water vapor and 10 ppm of oxygen. The same assembled members as in the first embodiment were put in the oven and brazed under the same condition as in the first embodiment.

Fifth Embodiment

A fluoride gas containing 200 ppm of HF was mixed with nitrogen gas which was being supplied to a brazing oven, to thereby fill the oven with a fluoride-containing nitrogen atmosphere, which contained 50 ppm of water vapor and 5 ppm of oxygen. The same assembled members as in the first embodiment were put in the oven and brazed under the same condition as in the first embodiment.

Sixth Embodiment

A fluoride gas containing 100 ppm of $KAlF_4$ which was heated to gasify as well as 70 ppm of HF was mixed with nitrogen gas which was being supplied to a brazing oven. Thus, the oven was filled with a fluoride-containing nitrogen atmosphere, which contained 200 ppm of water vapor and 15 ppm of oxygen. The same assembled members as in the first embodiment were put in the oven and brazed under the same condition as in the first embodiment.

Seventh Embodiment

An amount of solid $KAlF_4$ was placed in a dish-like receptacle which was 25 mm in depth. The receptacle was then put in a brazing oven filled with nitrogen gas and was heated in the oven to vaporize $KAlF_4$. Thus, the oven was filled with a fluoride-containing nitrogen atmosphere, which contained 200 ppm of $KAlF_4$ gas, 100 ppm of water vapor and 8 ppm of oxygen. The same assembled members as in the first embodiment were put in the oven and brazed under the same condition as in the first embodiment.

Eighth Embodiment

A brazing oven was filled, in the same manner as in the seventh embodiment, with a fluoride-containing nitrogen atmosphere which contained 100 ppm of $KAlF_4$ gas, 200 ppm of water vapor and 8 ppm of oxygen. The same assembled members as in the first embodiment were put in the oven and brazed under the same condition as in the first embodiment.

Ninth Embodiment $KAlF_4$ gas evaporated at 590 degrees centigrade was carried by a mixture of nitrogen gas and argon gas and was contained therein at a concentration of 30 ppm, so as to be fed to an electric oven employed as the pretreatment oven.

The same assembled members as in the first embodiment were put in the pretreatment oven and held therein for 1 (one) minute.

After that, said members were taken out of said pretreatment oven and immediately transferred to the brazing oven which was filled with a mixture of nitrogen gas and argon gas. The brazing process was carried out at 615 degrees centigrade for 5 (five) minutes. Contents of water vapor and oxygen gas were respectively 110 ppm and 26 ppm, in both of pretreatment and brazing ovens.

Tenth Embodiment

The pretreatment oven was filled with nitrogen gas which contained 200 ppm of HF gas. The same assembled members as in the first embodiment were put in the pretreatment oven and held therein for 1 (one) minute. After that, said members were taken out of said pretreatment oven and immediately transferred to the brazing oven which was filled with nitrogen gas. The brazing process was carried out under the same condition as in the ninth embodiment. Contents of water vapor and oxygen gas were respectively 50 ppm and 10 ppm, in both of pretreatment and brazing ovens.

Eleventh Embodiment

The pretreatment oven was filled with nitrogen gas, and supplied with a mixture of evaporated $KAlF_4$ gas and HF gas which were to be contained in the atmosphere within the pretreatment oven respectively at 100 ppm and at 80 ppm. The same assembled members as in the first embodiment were put in the pretreatment oven and held therein for 1 (one) minute. After that, said members were taken out of said pretreatment oven and immediately transferred to the brazing oven which was filled with nitrogen gas. The brazing process was carried out under the same condition as in the ninth embodiment. Contents of water vapor and oxygen gas were respectively 200 ppm and 15 ppm, in both of pretreatment and brazing ovens.

Comparative Reference 1

A eutectic complex compound of $AlF_3$ and $KF$ was used as a flux, which was dispersed in water to prepare a suspension containing 5% by weight of the flux. The same assembled members as in the first embodiment were immersed in this suspension so as to coat them with said suspension, and were dried thereafter.

The members coated with the flux were then heated at 600 degrees centigrade for 5 minutes within a nitrogen gas atmosphere containing 100 ppm of water vapor and 10 ppm of oxygen, so as to be brazed in said atmosphere.

The brazed members obtained in the abovedescribed embodiments and the comparative reference were visually inspected for their brazeability and for their appearance, in addition to evaluation of their aptitude with surface treatments. The aptitude was tested by the so-called "checkered pattern" method wherein a paint was sprayed onto flat surfaces of the members so that it was dried providing films thereon. The films were then scratched to form a number of small areas of 1 mm square. An adhesive tape was applied to the film surfaces and subsequently peeled off to count up areas from which the film pieces were not peeled. A result of those tests is given on Table 1.

As will be seen on Table 1, it has become possible according to the invention to satisfactorily braze the aluminum materials with a small amount of the fluoride gas wherein an excellent surface state is given to the brazed materials.

TABLE 1

| Sample | Brazeabilty (*1) | Appearance (*2) | Aptitude for Surface Treatment (*3) |
|---|---|---|---|
| 1st Embdt. | G | G | 100/100 |
| 2nd Embdt. | G | G | 100/100 |
| 3rd Embdt. | G | G | 100/100 |
| 4th Embdt. | G | G | 100/100 |
| 5th Embdt. | G | G | 100/100 |
| 6th Embdt. | G | G | 100/100 |
| 7th Embdt. | G | G | 100/100 |
| 8th Embdt. | G | G | 100/100 |
| 9th Embdt. | G | G | 100/100 |
| 10th Embdt. | G | G | 100/100 |
| 11th Embdt. | G | G | 100/100 |
| Comp. Ref. | G | N | 55/100 |

REMARKS:
The abbreviations "Embdt." and "Comp. Ref." denote "Embodiment " and "Comparative Reference 1", respectively.
(*1) "G" denote "Good", and "N" denote "No Good".
(*2) "G" means that any flux residue is not found visually and appearance is very clean.
"N" means that some amount of flux residue is found by visual inspection.
(*3) Ratio of the number of small square areas from which the paint film were not peeled to the total number of said small areas.

What is claimed is:

1. A method for brazing aluminum materials comprising producing a $KAlF_4$ gas-containing atmosphere within a brazing oven, fluxing and brazing the aluminum materials to be bonded to each other by heating said materials within said atmosphere at a predetermined temperature at which a brazing agent melts, said atmosphere containing an amount of 1 to 500 ppm of $KAlF_4$ gas.

2. A method according to claim 1 wherein the $KAlF_4$ gas-containing atmosphere is produced by introducing into the oven an inert gas and the gas through different passages.

3. A method according to claim 1 wherein the $KAlF_4$ gas-containing atmosphere is produced by introducing into the oven a mixture of an inert gas and $KAlF_4$ gas.

4. A method according to claim 1 wherein the $KAlF_4$ gas-containing atmosphere is produced by heating $KAlF_4$ in a receptacle which is placed in the oven so as to gasify the $KAlF_4$ within the oven

* * * * *